United States Patent
Dato

(10) Patent No.: US 7,783,461 B2
(45) Date of Patent: Aug. 24, 2010

(54) SYSTEMS AND METHODS FOR SIMULATING VEHICLE OPERATION

(75) Inventor: Gregory G. Dato, Agoura Hills, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 492 days.

(21) Appl. No.: 11/800,196

(22) Filed: May 4, 2007

(65) Prior Publication Data

US 2008/0275680 A1    Nov. 6, 2008

(51) Int. Cl.
G06F 17/50 (2006.01)
G06C 21/00 (2006.01)

(52) U.S. Cl. ............... 703/5; 703/7; 434/69; 463/1; 463/32; 701/123

(58) Field of Classification Search ............... 703/2, 703/7, 5; 434/69; 463/32, 1; 705/14; 701/123
See application file for complete search history.

(56) References Cited

U.S. PATENT DOCUMENTS

| | | | |
|---|---|---|---|
| 5,394,743 A | 3/1995 | Noguchi et al. | |
| 5,430,645 A | 7/1995 | Keller | |
| 5,550,762 A | 8/1996 | Doll | |
| 5,761,626 A | 6/1998 | Tascillo et al. | |
| 5,913,945 A | 6/1999 | Froelich et al. | |
| 5,986,545 A | 11/1999 | Sanada et al. | |
| 6,114,952 A | 9/2000 | Francesangeli et al. | |
| 6,324,449 B2 | 11/2001 | Albert et al. | |
| 6,468,374 B1 | 10/2002 | Kar et al. | |
| 6,612,929 B2 * | 9/2003 | Fujimoto et al. | 463/32 |
| 7,076,358 B2 | 7/2006 | Egami | |
| 2004/0029625 A1 * | 2/2004 | Annunziata | 463/1 |
| 2006/0231078 A1 * | 10/2006 | Barylski et al. | 123/511 |
| 2007/0192018 A1 * | 8/2007 | Gibson et al. | 701/110 |
| 2008/0120175 A1 * | 5/2008 | Doering | 705/14 |
| 2008/0254417 A1 * | 10/2008 | Mohamed | 434/69 |

OTHER PUBLICATIONS

International Search Report and Written Opinion dated Jul. 31, 2008 pertaining to International application No. PCT/US2008/055459.
International Preliminary Report on Patentability dated Nov. 19, 2009 pertaining to International application No. PCT/US2008/055459.

* cited by examiner

*Primary Examiner*—Thai Phan
(74) *Attorney, Agent, or Firm*—Dinsmore & Shohl LLP

(57) ABSTRACT

Systems for simulating vehicle operation include a computer having a pedal activation program, the pedal activation program comprising instructions for generating signals relating to operation of a vehicle from the computer to a pedal sensor output according to a predetermined driving profile. Methods for simulating vehicle operation include providing a computer having a pedal activation program, utilizing the pedal activation program to initiate output signals to a pedal sensor output relating to a vehicle condition and transmitting the output signals to an engine control unit to implement a driving profile programmable within the pedal activation program.

16 Claims, 2 Drawing Sheets

SYSTEMS AND METHODS FOR SIMULATING VEHICLE OPERATION

TECHNICAL FIELD

The present invention relates to systems and methods for simulating vehicle operation. More particularly, the present invention relates to systems and methods for simulating accelerator and/or brake pedal inputs for evaluating vehicle drivability.

BACKGROUND

Automobile manufacturers often test the performance of vehicles on dynamometers. During such tests, mechanical actuation of the accelerator and brake pedals is frequently simulated in order to test and record data related to engine conditions, acceleration and braking. So that the tests are standard from one test to another, or one vehicle to another, it is important that the testing parameters (e.g., actuation of the accelerator/brake pedals) be repeatable. Currently, driving robots are typically used to perform these functions. The driving robot use a mechanical actuator to operate the accelerator/brake pedals. Issues arise, however, in that driving robots are complex mechanisms that require hard mounting to the floorboard of the vehicle. Hard mounting of the driving robot makes it difficult for a driver to sit in the driver's seat, such as when a road test with a human driver is desired.

Accordingly, there is a need for improved systems and methods for simulating vehicle driving in a repeatable manner.

SUMMARY

In accordance with one embodiment of the present invention, a system is provided for simulating vehicle operation comprises a computer having a pedal activation program. The pedal activation program comprises instructions for generating signals relating to operation of a vehicle from the computer to a pedal sensor output according to a selected driving profile.

In accordance with another embodiment of the present invention, a method for simulating vehicle operation comprises providing a computer having a pedal activation program, utilizing the pedal activation program to initiate output signals to a pedal sensor output relating to a vehicle condition and transmitting the output signals to an engine control unit to implement a driving profile programmable within the pedal activation program.

In accordance with yet another embodiment of the present invention, a method for simulating vehicle operation comprises providing a computer having a pedal activation program, selecting a driving profile related to a vehicle operation, generating output signals in accordance with the selected driving profile, transmitting the output signals to a pedal sensor output, and transmitting control signals to an engine control unit to implement the driving profile.

BRIEF DESCRIPTION OF THE DRAWINGS

The following detailed description of specific illustrative embodiments of the present invention can be best understood when read in conjunction with the following drawings in which.

DETAILED DESCRIPTION OF ILLUSTRATIVE EMBODIMENTS

Figure 1:
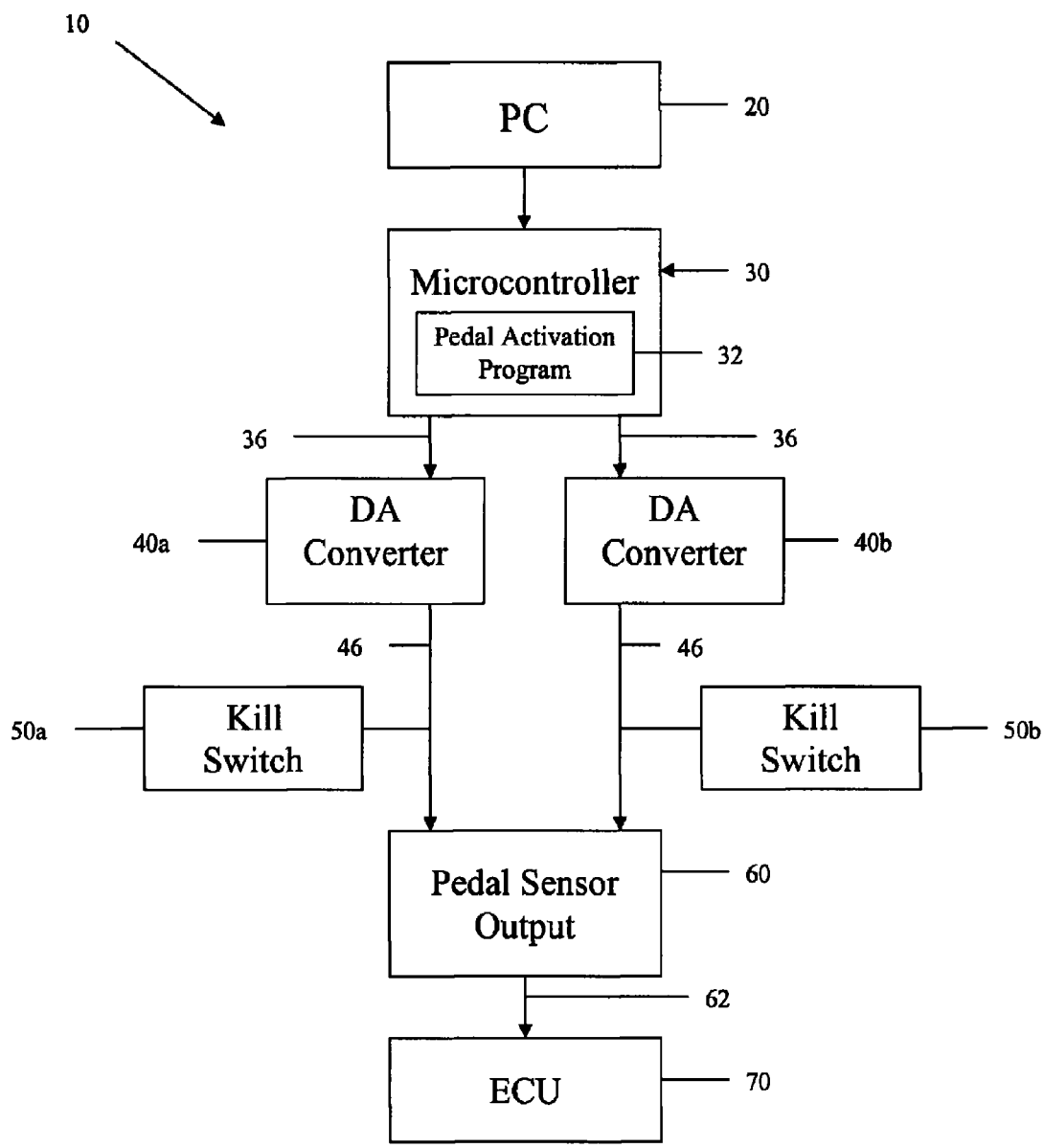
FIG. 1 is a schematic illustration of an exemplary system for simulating vehicle driving in accordance with one or more embodiments of the present invention.

Referring to FIG. 1, an exemplary system 10 for simulating vehicle operation is illustrated. The system 10 may generally comprise a personal computer (PC) 20, a microcontroller 30, a digital to analog converter 40 and a kill switch 50. As discussed later herein, these components may be configured to control vehicle conditions such as acceleration and braking through connection to other parts of system 10 such as the vehicle's pedal sensor output 60 and/or engine control unit (ECU) 70.

With respect to the components of the exemplary system, PC 20 can be any portable, desktop or laptop computer such as one having memory and a CPU and running a standard operating system. PC 20 may be connected to a microcontroller 30 via a serial cable. Microcontroller 30 may comprise any integrated circuit or computer capable of at least 8-bit output and generally include, for example, a CPU, communication interfaces and storage. Microcontrollers 30 contemplated herein are generally available from any number of vendors. The functionality of the microcontroller 30 and/or its pedal activation profile program (discussed later herein) may be integrated with PC 20.

Microcontroller 30 of system 10 may include a pedal activation program 32, and in one embodiment, may remain resident on the vehicle. Pedal activation program 32 may comprise instructions for generating output signals 36 according to a desired driving profile. Particularly, as discussed later herein, a driving profile may comprise a set of instructions to operate the vehicle (e.g., the acceleration pedal and/or brake pedal) according to desired parameters. For example, if a technician is interested how a vehicle might perform over a simulated stretch of road with frequent acceleration/deceleration, the technician may chose such a driving profile from the pedal activation program 32. Pedal activation program 32 may also comprise driving profiles to simulate driving on hills, curves or while passing. Alternatively, a technician who is interested in testing performance of the vehicle may simply input a certain acceleration over time as a driving profile to be instituted by the pedal activation program 32. Accordingly, the driving profile can comprise any desired vehicle operation that will be initiated by the pedal activation program 32 within the microcontroller 30.

In addition, as can be understood, the functionality of the pedal activation program described herein can be implemented using software, firmware, and/or associated hardware for carrying out the desired tasks. For instance, the various functionalities described can be programmed as a series of instructions, code, files, or commands using general purpose or special purpose programming languages or programs, and can be executed on one or more general purpose or special purpose computers, processors, other control circuitry, or networks.

Still referring to FIG. 1, output signals may leave the microcontroller 30 as 4-6-8 digital output signals and pass through digital to analog converters (DAC) 40*a* and 40*b*. Digital to analog converters 40*a* and 40*b* may convert the digital signals of the microcontroller 30 to a discrete voltage which will ultimately control acceleration and/or braking through the pedal sensor output 60, as discussed later herein. In one embodiment, such as that illustrated in FIG. 1, system 10 may comprise two DACs 40*a* and 40*b* separate from microcontroller 30. In another embodiment, however, one or more DACs and/or their functionality may be integrated within microcontroller 30.

According to the pedal activation program and the desired driving profile, microcontroller 30 may out put digital signals 36 through DACs 40a and 40b (which emerge as discrete voltage signals 46) to pedal sensor output 60 (e.g., in one embodiment, the wiring harness and/or output wires of the pedal sensor). In one embodiment, as illustrated in FIG. 1, discrete voltage signals 46 may first pass through kill switches 50a and 50b. Such kill switches 50a and 50b enable an operator or technician to terminate all signals transmitted to the pedal sensor output 60 in the event of a malfunction or other issues. Voltage signals 46 reach one or more sensor outputs of pedal sensor. In normal driving operation, pedal sensor output 60 generally receives mechanical input from the accelerator pedal in the form of a mechanical input. System 10 of the present invention applies a simulated input to the pedal sensor output (which is transmitted to the ECU) in a manner similar to what the pedals would provide. In other words, the systems described herein can actually replace the pedal sensor output (the mechanical output of the pedal) that normally represents pedal input with a desired profile.

Still referring to FIG. 1, once pedal sensor output 60 receives voltage signals from the microcontroller 30, pedal sensor output 60 outputs control signals 62 to the vehicle ECU to control vehicle conditions according to the selected driving profile from the pedal activation program 32. It will be understood that generation of control signals by the pedal sensor output can comprise simply relaying the output signals to the ECU without a change of the output signal itself (e.g., control signals may be the output signals). In one embodiment, pedal activation program 32 may control acceleration of the vehicle. In such an embodiment, microcontroller 30 may output signals 36 through the DACs 40a and 40b (now voltage signals 46) directly to accelerator pedal outputs. Where the pedal activation program 32 is set to additionally (or individually) control braking, microcontroller 30 may output signals 36 through the DACs 40a and 40b (now voltage signals 46) directly to brake pedal outputs.

Figure 2:
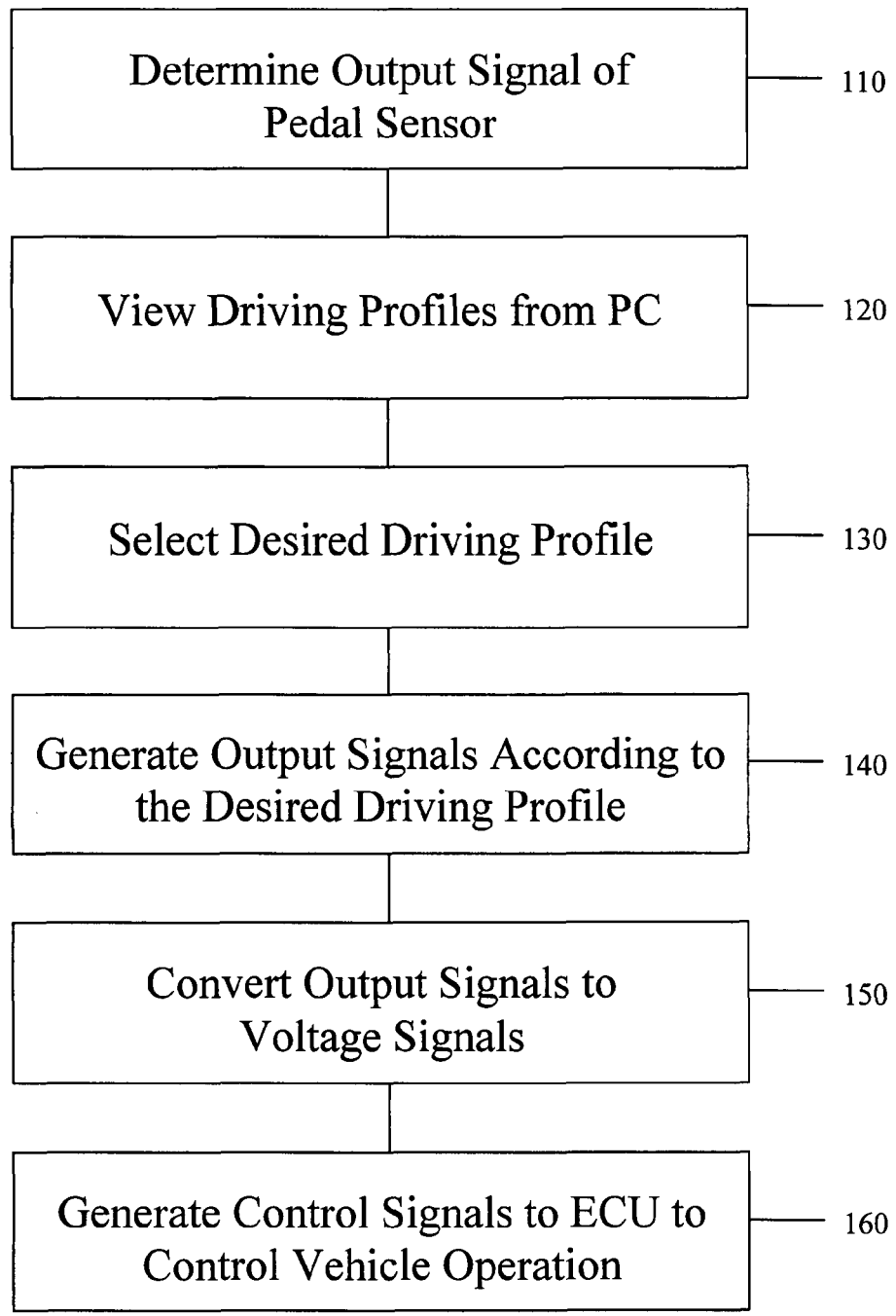
FIG. 2 is a flowchart depicting an example of a method for simulating vehicle driving in accordance with one or more embodiments of the present invention.

Through application of the pedal activation program 32 and the system 10 described herein, the desired driving profile (which includes desired acceleration and/or braking that may be encountered by a vehicle over a stretch of road) may be repeatably simulated. In operation, and referring to FIGS. 1 and 2, prior to starting the pedal activation program 32, the output signal of the accelerator pedal (or brake pedal in another embodiment) at or about 0% and 100% should be determined 110. Any possible output that can simulate what any driver could perform can be created. Desired driving profiles of the pedal activation program 32 may be viewed 120 and selected 130 through the PC 20. It should be understood that each driving profile will ultimately relate to the amount of voltage that will be applied to the pedal sensor output.

In one embodiment, the voltage signal to be generated via the pedal activation program can be selected to follow a step or ramp output according to the desired driving profile. In such an embodiment, the start and maximum voltage can be entered on the PC 130. In another embodiment, driving profile may comprise predetermined starting, running and maximum voltages to simulate vehicle operation over a stretch of road. The microcontroller 30 generates output signals 36 according to the driving profile selected and/or the pedal activation program 140. The output signals 36 may be converted to voltage signals 46 by a digital to analog converter or other apparatus 150. The voltage signals 46 may be received by the pedal sensor output 60 which generates control signals 62 to control the ECU 62 to control vehicle operation according to the selected driving profile from the pedal activation program 160.

One feature of at least some embodiments is that drivability tests can be repeated from one test to another and one vehicle to another without the use of hard mounted robots. Moreover, the microcontroller of the present invention may be configured such that it remains resident on the vehicle. In such an embodiment, the driving profile may be selected through an associated PC. In another embodiment, microcontroller can be used without PC. In addition, where issues are determined during testing with human drivers or during standard operation by customers, the issues can be electronically duplicated through the systems described herein. Duplication of these issues may be beneficial in assisting manufacturers to evaluate potential problem areas for new and used vehicles.

While particular embodiments and aspects of the present invention have been illustrated and described, various other changes and modifications can be made without departing from the spirit and scope of the invention. Moreover, although various inventive aspects have been described, such aspects need not be utilized in combination. It is therefore intended to cover in the appended claims all such changes and modifications that are within the scope of this invention.

What is claimed is:

1. A system for operating a vehicle, the system comprising a computer having a pedal activation program, a digital to analog converter, and a kill switch, wherein:

said pedal activation program comprises instructions for generating signals relating to operation of said vehicle according to a selected driving profile;

said digital to analog converter is electrically coupled to said computer and converts said signals to voltage signals and transmits said voltage signals to a pedal sensor output such that said pedal sensor output generates control signals to control an engine control unit of said vehicle to operate said vehicle in accordance with said driving profile; and said kill switch is connected between said digital to analog converter and said pedal sensor output.

2. The system of claim 1, wherein said computer comprises a microcontroller connected to a PC.

3. The system of claim 1, wherein said pedal sensor output is an accelerator pedal sensor output.

4. The system of claim 1, wherein said computer is configured to remain resident on said vehicle while said vehicle is in motion over a road.

5. A method for operating a vehicle, the method comprising:

providing a system comprising a computer having a pedal activation program, a digital to analog converter, and a kill switch, wherein said computer is coupled to said digital to analog converter, and wherein said digital to analog converter is coupled to said kill switch;

coupling said system to an engine control unit of said vehicle via a pedal sensor output;

utilizing said pedal activation program to initiate output signals to said pedal sensor output relating to operating conditions of said vehicle; and transmitting said output signals from said computer through said digital to analog converter and said kill switch to said engine control unit of said vehicle to operate said vehicle and to implement a driving profile on said vehicle, wherein said driving profile is programmable within said pedal activation program.

6. The method of claim 5, wherein said digital to analog converter converts said output signals to voltage signals.

7. The method of claim 6, further comprising converting voltage signals within said pedal sensor output to control signals for transmission to said engine control unit.

8. The method of claim 5, wherein utilizing said pedal activation program comprises selecting a driving profile relating to said operating conditions of said vehicle.

9. The method of claim 8, wherein said driving profile comprises predetermined instructions relating to said operating conditions of said vehicle.

10. The method of claim 5, wherein said operating conditions of said vehicle comprise acceleration.

11. The method of claim 5, further comprising configuring said computer to remain resident on said vehicle while said vehicle is in motion over a road.

12. A method for operating a vehicle, the method comprising:
providing a system comprising a computer having a pedal activation program, a digital to analog converter, and a kill switch, wherein said computer is coupled to said digital to analog converter, and wherein said digital to analog converter is coupled to said kill switch;
coupling said system to an engine control unit of said vehicle via a pedal sensor output;
selecting a driving profile related to operating conditions of said vehicle;
generating output signals in accordance with said selected driving profile;
transmitting said output signals from said computer through said digital to analog converter and said kill switch to said pedal sensor output; and
transmitting control signals from said pedal sensor output to said engine control unit of said vehicle so as to implement said driving profile on said vehicle.

13. The method of claim 12, wherein said digital to analog converter converts said output signals to voltage signals.

14. The method of claim 12, wherein said driving profile comprises predetermined instructions relating to operating conditions of said vehicle.

15. The method of claim 12, further comprising configuring said computer to remain resident on said vehicle while said vehicle is in motion over a road.

16. The method of claim 12, further comprising generating said control signals within said pedal sensor output.

* * * * *